United States Patent [19]
Burnham et al.

[11] Patent Number: 5,181,211
[45] Date of Patent: Jan. 19, 1993

[54] EYE-SAFE LASER SYSTEM

[75] Inventors: Ralph L. Burnham, Reston; Jeffrey J. Kasinski, Fairfax; Larry R. Marshall, Reston, all of Va.

[73] Assignee: Fibertek, Inc., Herndon, Va.

[21] Appl. No.: 702,531

[22] Filed: May 20, 1991

[51] Int. Cl.$^5$ ............................................. H01S 3/10
[52] U.S. Cl. ............................ 372/21; 372/106; 372/20; 372/98; 372/23
[58] Field of Search .............. 372/3, 98, 99, 20, 21, 372/23

[56] References Cited

U.S. PATENT DOCUMENTS

| | | | |
|---|---|---|---|
| 3,668,420 | 6/1972 | Vanderslice | 372/3 |
| 3,949,323 | 4/1976 | Bierlein et al. | 332/7.51 |
| 4,231,838 | 11/1980 | Gier | 156/600 |
| 4,272,733 | 6/1981 | Walling et al. | 372/41 |
| 4,761,202 | 8/1988 | Bordui et al. | 156/621 |
| 4,953,166 | 8/1990 | Mooradian | 372/92 |
| 5,025,446 | 6/1991 | Kuizenga | 372/21 |
| 5,053,641 | 10/1991 | Cheng et al. | 372/21 |
| 5,065,046 | 11/1991 | Guyer | 372/21 |

OTHER PUBLICATIONS

Burnham, Stolzenberger, Pinto; "Infrared Optical Parametric Oscillator in Potassium Titanyl Phosphate"; Jan. 1989; IEEE Photonics Technology Letters vol. 1, No. 1.

*Primary Examiner*—Léon Scott, Jr.

[57] ABSTRACT

An eye-safe laser operating at high efficiency, pulse repetition rate and power output is described. The laser comprises a diode-array pumped laser having a pumping wavelength range which produces a polarized output beam. The output beam passes through a nonlinear tunable parametric converter crystal having X, Y, and Z principal axes. Noncritical phase matching is produced in said laser by phase matching for a beam propagation parallel to a principal axis which results in a high efficiency of laser operation. The nonlinear tunable parametric converter crystal converts the wavelength of an otherwise unsafe laser beam output to one that is harmlessly absorbed by the human eye.

4 Claims, 1 Drawing Sheet

EYE-SAFE LASER SYSTEM

BACKGROUND OF THE INVENTION

The present invention generally relates to laser systems and more particularly, is concerned with a laser system that generates a beam that is safe to the human eye.

The use of lasers in recent years has been continually increasing. The greater the power of lasers, the more risk there is to the people who may come into contact with the system.

Specifically, when a collimated beam of visible light enters the eye cornea, it passes through or is otherwise absorbed by the vitreous humor. The portion of the beam that is not absorbed is focused by the eye lens onto the retina. Under normal conditions, the light energy is converted by the retina into chemical energy, stimulating optical sensations. Eye injury results because the focused high energy laser beam cannot be absorbed and causes damage to the retina. This damage does not occur when conventional sources of illumination are exposed to the eye because the light is emitted in all directions and produce a sizeable (rather than focused) image on the retina that can be safely absorbed. It has been determined in the industry that laser beams having a wavelength in the range of 1.5 um to 2.2 um is completely absorbed by the vitreous humor thereby alleviating any damage to the retina.

Laser system used as optical radar and communication transmitters in populated locations need to be operated so as to avoid eye damage.

Up to the present, eye-safe lasers generally had low efficiency. Two of the predominant eye-safe lasers are based on laser emission in erbium-doped solid-state host materials pumped by pulsed gas discharge lamps or laser diodes, or on frequency conversion of a neodymium laser using stimulated Raman scattering in a molecular gas such as methane. These devices have many shortcomings. The erbium lasers have low efficiency (typically less than 0.1%) owing to the low stimulated emission coefficient of the laser transition in erb um $3+$ ions at a 1.54 um output and to the low efficiency for optical pumping with the visible flash lamp. Further, the erbium laser can only be operated in a pulsed mode. Stimulated Raman conversion requires a cell containing a high pressure flammable gas. This gas is excited by a neodymium pump laser to emit stimulated radiation in the eye-safe region. The Raman conversion therefore is not amenable to continuous wave operation. In addition, since the Raman process deposits energy in the conversion medium, causing thermal distortions, the eye-safe Raman laser cannot be conveniently operated at high average power or repetition rate.

Consequently, a need exists for the availability of a laser system operating in an eye-safe frequency with acceptable efficiency, a high pulse repetition rate and high average output power.

SUMMARY OF THE INVENTION

The present invention provides an eye-safe laser operating at high efficiency, pulse repetition rate and power output without having the deficiencies of the aforementioned prior art systems. The inventive system employs, as a key element, a tunable parametric converter to convert the wavelength of an otherwise unsafe laser beam output to one that is harmlessly absorbed by the human eye.

The preferred embodiment of the laser system utilizing the present invention includes a diode-array pumped Nd:YAG, or Nd:YLF solid state laser to provide a polarized output beam. The tunable parametric convertor is a nonlinear crystal having defined principal X, Y and Z axes. The preferred crstal must be capable of being incorporated both internal and external to the laser cavities to provide a means to convert the wavelength of the laser sources. Such non-linear crystal can take the form of either an optical parametric oscillator (OPO) or parametric amplifier (OPA). OPOs and OPAs generate two waves of longer wavelength than the input wave. Their output can be tuned over a wide range of wavelengths from a single input source at a fixed wavelength.

For efficient energy transfer between the input and output waves, it is necessary that the waves remain in phase. In order for this to occur, the refraction index of the crystal for the input wave must be the same as for the output wave. However, almost all materials have normal dispersion in the optical region. Therefore, the output waves will generally lag behind the input wave providing for less efficient energy transfer. This means that the output intensity will be much less than the input intensity.

Crystals that can offset the undesired dispersion have the property known as birefringence. Such property means that the refractive index of a non-linear crystal for a given input wave depends on:

a. The frequency (or reciprocally, wavelength) of the wave;
b. The direction of propagation of the wave, relative to the axes of the crystal;
c. The polarization of the wave;
d. Properties of the crystal itself, including temperature.

It is therefore possible, given an input wave of a given wavelength and polarization, to change the direction of propagation through the crystal by rotating the crystal so that the input wave is in phase with an output wave of particular wavelength and polarization. This technique is called "phase matching". Phase matching helps ensure high conversion efficiency.

Each crystal has defined X, Y and Z axes, which are known as the principal axes. Phase matching is achieved by selecting the direction of beam propagation with respect to the principal axes such that all three waves (pump, signal and idler) remain in phase as they travel through the crystal. The phase matching angle is generally unique in that phase matching can only be achieved in that direction for particular input and generated wavelengths and polarizations.

If phase matching is achieved in a direction that is not parallel to one of the principal crystalline axes (X, Y, or Z), then the input and generated waves will "walk off" from one another as they propagate through the crystal. This is caused by "double refraction" in the crystal, and the angle at which the input and generated wave walk off is known as the "walkoff angle". Also, if the beams do not propagate parallel to one of the principal axes, phase matching only occurs over an extremely narrow range of angles such that small divergence of the input wave will prevent phase matching. This leads to practical difficulties. Phase-matching along a propagation direction not parallel to a principal crystal axis (X, Y, and Z) is termed critical phase matching.

Noncritical phase matching occurs when one may phase match for beam propagation parallel to a principal crystal axis. In this case, small deviations from the phase matching angle do not have such large effects as in critical phase matching, nor is there any walkoff angle between the beams. Non critical phase matching results in the highest efficiency of operation.

An OPO can be tuned, given an input wave of particular wavelength, by rotating the crystal and phase matching with a output wave of a different wavelength. An OPO will be very efficient if the crystal is aligned such that noncritical phase matching occurs.

The preferred crystal for use in the present invention is Potassium Titanyl Phosphate (KTP). The KTP crystal has a high linear coefficient, a high linear coefficient, a high damage threshold and a large angular and temperature acceptance range.

DETAILED EXPLANATION OF THE INVENTION

Figure 1:
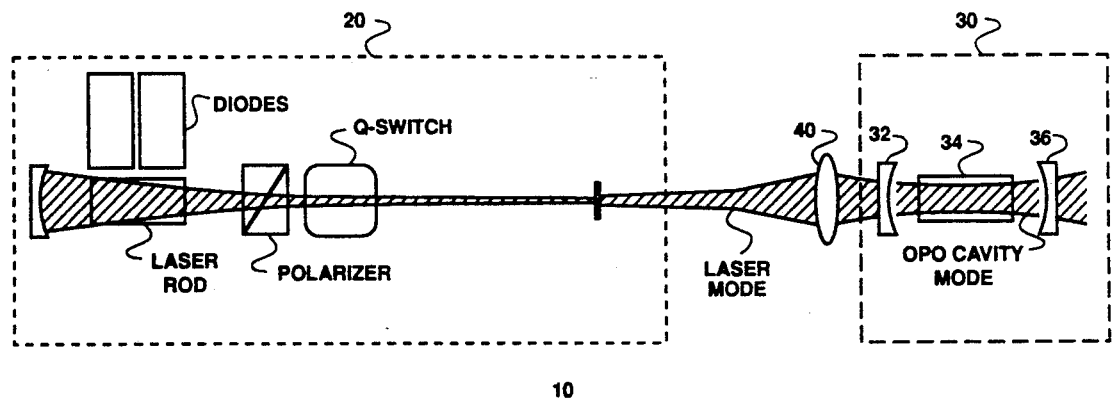
FIG. 1 illustrates an embodiment of the invention utilizing an optical parametric oscillator, pumped by a solid-state laser.

Referring now to the drawings, and more particularly FIG. 1, there is shown an eye safe laser system, generally designated 10, which incorporates the preferred embodiment of the present invention. The laser system 10 includes a pump laser, generally designated 20 and an optical parametric oscillator, generally designated 30. Pump laser 20 consists of an Nd Yag laser crystal being pumped by a solid-state diode array. Such pump lasers are well known and readily available. Other laser crystals, such as Nd YLF may be utilized. It should be understood that the pump laser 20 consists of known elements familiar to those versed in the use of solid state lasers. The pump laser could be any other source generating single transverse mode (TEMoo) output in the wavelength range 1.0 um to 1.1 um.

Still referring to FIG. 1, the optical parametric oscillator or OPO 30 is shown to include mirrors 32 and 36 and wavelength converter 34. Mirror 32 is coated for high transmission of beam wavelengths between 1.0 um and 1.1 um and high reflection of wavelengths between 1.5 um and 2.2 um.

Mirror 36 is coated to have a high reflectance for wavelengths between 1.0 um and 1.1 um and partially reflective to wavelengths between 1.5 um and 2.2 um. It is preferable to coat mirror 36 so that between 50% and 90% of signals having wavelengths between 1.5 um and 2.2 um are reflected. It is not essential that mirror 36 reflect wavelengths between 1.0 um and 1.1 um, but such reflection does lower the input energy required to operate the device.

The positioning of mirror 32, KTP crystal 34 and mirror 36 as explained above results in a resonant optical cavity wherein the unconverted pump laser beam is reflected back into converter 34 from output mirror 36 for further processing.

In the preferred embodiment converter 34 is a crystal having a high non-linear coefficient, a high damage threshold and a large angular and temperature acceptance range. Specifically, crystal 34 is Potassium Titanyl Phosphate (KTiOPO$_4$ or "KTP" for short) and has defined principal axes "X", "Y" and "Z" defined by convention familiar to those versed in the physics of crystals. Hereinafter converter 34 will be referred to as crystal 34 for case of explanation.

Crystal 34 is cut into a convenient shape for mounting, and in the preferred embodiment shown in FIG. 1 is a rectangular prism. The cut is made so that the principal axes of the crystal are perpendicular to the faces of the rectangular prism, so that the incident beam propagates along a principal axis when it strikes perpendicular to the face of the rectangular crystal 34. The input wave is aligned with the appropriate face. Phase matching is thus achieved so as to convert the 1.06 um pump beam propagating parallel to the X-axis to 1.6 um wavelength or 1.54 um wavelength for the same pump beam propagating parallel to the Y-axis.

Figure 2:
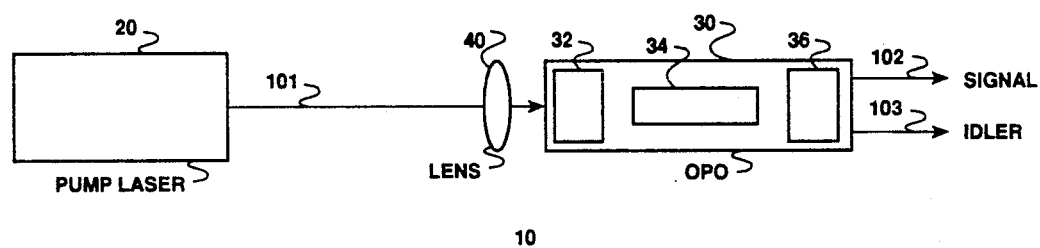
FIG. 2 is a schematic illustrating the conversion of beam wavelength utilizing the embodiment shown in FIG. 1.

The operation of laser system 10 can be explained by referring to FIG. 2. Pump laser 20 generates pump beam 101 having a wavelength between 1.0 um and 1.1 um. Pump beam 101, polarized parallel to the "Y" axis of crystal 34 propagates through lens 40 and mirror 32 into crystal 34. The orientation of crystal 34 is such that pump beam 101 travels parallel to the "X" axis. The effect of crystal 34 on pump beam 101 results in two output beams, one having a wavelength between 1.5 um-2.2 um referred to in FIG. 2 as signal 102 and the other having a wavelength between 3.0 um-3.2 um referred to as idler 103. Any pump beam that is not converted during the initial pass through crystal 34 is reflected back into the OPO for further processing.

Signal 102 continues in the "X" direction polarized parallel to the "Y" axis of crystal 34 while idler 103 is polarized in a direction parallel to the "Z" axis of crystal 34. With crystal 34 oriented as described above and shown in FIG. 1 and 2, non-critical phase matching results. In this orientation, the highest conversion efficiency in an eyesafe wavelength is obtained. The crystal may be made longer to further increase efficiency, especially when lower power input beams are utilized.

Resulting idler wave having a 3.2 um wavelength is allowed to pass out of the oscillator without reflection. An alternate embodiment interchanges the roles of the signal and idler beams; i.e., the idler can be resonated in the oscillator cavity, allowing the signal to pass out of oscillator without reflection.

It is to be understood that the surfaces of mirrors 32 and 36 may be flat, concave or convex.

Mode matching is accomplished by providing lens 40 between pump laser 20 and OPO 30. Lens 40 focuses the pump laser beam into OPO 30 so that mode matching is accomplished. Mode matching is a known procedure wherein the size of the pumped laser beam spot in KTP crystal 34 is equal to the signal spot in the resonator. The resonator in which the KTP resides has a given mode shape defined by the mirrors employed to form that resonator. The mode of a resonator describes the path taken by rays that repetitively reflect off each mirror such that they re-trace the same path upon each reflection. The lens is used to alter the shape of the input beam so that it matches the shape of the OPO resonator mode. If the OPO employs flat mirrors then mode matching can occur without the need of a lens, since in this case the resonator mode is a beam of parallel light;

then mode matching is achieved simply by using a low divergence laser beam to provide the input wave to the OPO. If the OPO uses identical concave mirrors, a lens must be provided. In that instance the mode will have a waist (smallest size) at the center of the resonator, and the pump will need to be focused to match the resonator mode.

It is noted that the wavelength of the output signal can be changed by rotating the crystal with respect to any of its principal X, Y and Z axes.

Figure 3:
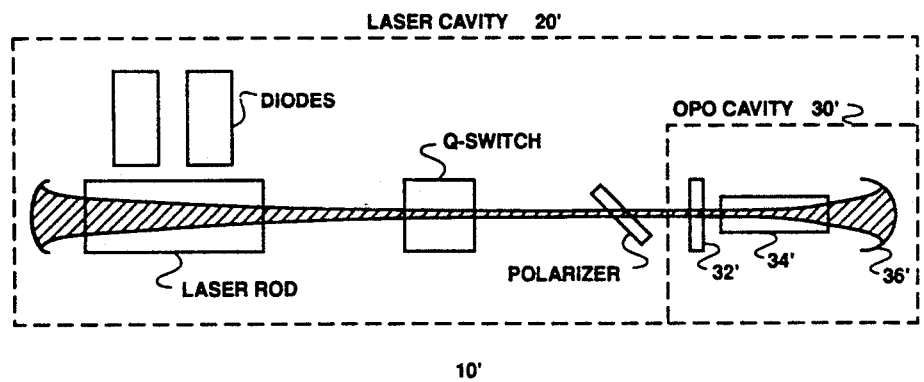
FIG. 3 illustrates an alternative embodiment of the invention in which the crystal is located within the optical cavity of the pump laser.

Referring now to FIG. 3, an alternative embodiment is illustrated in which OPO 30' is placed in what is called an "intracavity configuration", because the OPO cavity is now inside the laser cavity. In this configuration, pump laser 20' and OPO 30' both utilize the same mirror 36'. The OPO resonator is formed by mirrors 32' and 36'. As indicated above, the crystal 34' is oriented for non-critical phase matching, but is now located within the optical cavity of pump laser 20'. The mirrors perform the same functions as in the embodiment illustrated in FIG. 1. Mirror 36' reflects the pump and partially transmits the signal at 1.6 um; and mirror 32' transmits the pump and reflects the signal.

In operation, the embodiment shown in FIG. 3 provides a lower power threshold for wavelength conversion than that of the embodiment of FIG. 1, resulting in the ability for a successful parametric conversion utilizing continuous wave operation. Further, the efficiency of the intracavity configuration can be higher because the pump power that is not converted to the 1.5 um-2.2 um wavelength in crystal 34' is reflected back into crystal 34' for subsequent conversion.

It is thought that the eyesafe laser system apparatus and method of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A solid state laser beam producing system comprising:
   a first means for producing a first beam having a pumping wavelength range of from 1.0 um to 1.1 um; a second means, nonlinear and rotatable with respect to three defined X, Y, and Z principal axes for converting said first beam into a second signal beam, and a third idler beam; said second beam having a signal wavelength of from 1.5 um to 2.2 um and said third beam having an idler wavelength given by the frequency difference between the said first beam and said second beam and wherein said first beam travels parallel to one of the said principal axes of the said second means; and said second beam is polarized by polarization means in a direction parallel to a second of said three principal axes and said third beam is polarized in a direction parallel to the third of said principal axes such that noncritical phase matching is achieved and wherein said second converted signal beam has an eyesafe wavelength of no more than 2.2 um.

2. The system of claim 1 wherein said second means is a nonlinear $KTiOPO_4$ crystal.

3. The system of claim 1 wherein a laser rod, said polarizer and a Q-switch, and reflection means, make up a laser cavity inside of which said laser beam can resonate and wherein a tunable parametric converter is located outside of the laser cavity.

4. The system of claim 3 wherein a lens is disposed between said first means and a tunable parametric oscillator, housing said second means to produce mode matching.

* * * * *